US006498445B2

(12) United States Patent
Fujiwara et al.

(10) Patent No.: US 6,498,445 B2
(45) Date of Patent: Dec. 24, 2002

(54) OSCILLATION APPARATUS FOR OSCILLATING ROLLER

(75) Inventors: Masaomi Fujiwara, Chiba (JP); Hideki Mori, Toride (JP)

(73) Assignee: Komori Corporation, Tokyo (JP)

( * ) Notice: Subject to any disclaimer, the term of this patent is extended or adjusted under 35 U.S.C. 154(b) by 34 days.

(21) Appl. No.: 09/764,124

(22) Filed: Jan. 19, 2001

(65) Prior Publication Data

US 2001/0009358 A1 Jul. 26, 2001

(30) Foreign Application Priority Data

Jan. 20, 2000 (JP) ........................................ 2000-11362

(51) Int. Cl.[7] ................................................ H02K 33/00

(52) U.S. Cl. ....................... 318/119; 318/115; 318/134; 318/686; 318/671; 101/350.3

(58) Field of Search ................................ 318/119, 134, 318/115, 686, 671, 350.3

(56) References Cited

U.S. PATENT DOCUMENTS

| | | | | |
|---|---|---|---|---|
| 2,366,199 A | | 1/1945 | Kunz | 74/96 |
| 4,837,585 A | * | 6/1989 | Williams et al. | 347/21 |
| 5,826,508 A | * | 10/1998 | Komori | 101/350.3 |
| 5,974,970 A | * | 11/1999 | Izume | 101/350.1 |
| 6,024,017 A | * | 2/2000 | Okuda | 101/148 |

FOREIGN PATENT DOCUMENTS

| | | |
|---|---|---|
| DE | 82330570 U 0 | 1/1986 |
| JP | 63-170138 U | 11/1998 |
| JP | 63-264352 A | 11/1998 |

* cited by examiner

*Primary Examiner*—Rita Leykin
(74) *Attorney, Agent, or Firm*—Birch, Stewart, Kolasch & Birch, LLP

(57) ABSTRACT

An oscillation apparatus includes an oscillation mechanism for reciprocating an oscillating roller which can be rotated in the circumferential direction and can be reciprocated along the axial direction; an oscillation-width adjustment mechanism for adjusting the oscillation width of the oscillating roller; an oscillation-mechanism drive motor for operating the oscillation mechanism; an oscillation-width adjustment motor for operating the oscillation-width adjustment mechanism; oscillation-width controller for controlling operation of the oscillation-width adjustment motor such that the oscillation width of the oscillating roller attains a designated value; and oscillation-number controller for controlling operation of the oscillation-mechanism drive motor, on the basis of the number of revolutions of the plate cylinder, such that the number of oscillations of the oscillating roller per unit number of revolutions of the plate cylinder attains a designated value.

4 Claims, 12 Drawing Sheets

Related Art

OSCILLATION APPARATUS FOR OSCILLATING ROLLER

BACKGROUND OF THE INVENTION

1. Field of the Invention

The present invention relates to an oscillation apparatus for adjusting the oscillation state of an oscillating roller of an ink supply apparatus of a printing press.

2. Description of the Related Art

When securities or the like are printed, rainbow printing is performed for prevention of forgery. When such rainbow printing is performed, an oscillation apparatus for adjusting the oscillation state of an oscillating roller of an ink supply apparatus plays an very important role. Such a conventional oscillation apparatus will be described with reference to FIG. 12.

Ink stored in an ink fountain of an ink supply apparatus is supplied to oscillating rollers 101 and 102 of a printing press; and a hydraulic pump 112 is operated in order to feed a working fluid from a hydraulic tank 111 to a hydraulic cylinder 115. As a result, the oscillating roller 101 is reciprocated along its axial direction, and the oscillating roller 102 is also reciprocated along its axial direction via an oscillation lever 103, so that ink is supplied to a plate cylinder while being spread in the axial direction of the oscillating rollers 101 and 102.

The oscillation number of the oscillating roller 102 is converted to an electrical signal by means of a differential transformer 118, and the electrical signal is fed to an amplifier 116. The number of revolutions of an impression cylinder 100 is converted to a pulse signal by means of a rotary encoder 117, and the pulse signal is fed to the amplifier 116. When the oscillation width of the oscillating rollers 101 and 102 is set through operation of a volume 119, the signals fed to the amplifier 116 and the set oscillation width are computed in order to obtain a signal indicating a set value, which is output to a flow control valve 113. Further, while the value set by use of the volume 119 and the signal from the differential transformer 118 are compared with each other, pulses from the rotary encoder 117 are computed in order to output a signal to a direction control valve 114 at a predetermined timing that matches operation of the printing press. Through the above-described operation performed continuously within the amplifier 116, the oscillation state (oscillation width and number of oscillations) of the oscillating rollers 101 and 102 can be adjusted (see Japanese Patent Application Laid-Open (kokai) No. 63-264352 and Japanese Utility Model Application Laid-Open (kokai) No. 63-170138).

The conventional oscillation apparatuses as described above have the following problems.

(1) Since the amount and direction of fluid supplied to the hydraulic cylinder 115 are controlled by the flow control valve 113 and the direction control valve 114 to thereby adjust the oscillation width and number of oscillations of the oscillating rollers 101 and 102, the mechanism for controlling the hydraulic cylinder 115 is complicated.

(2) Insufficient responsiveness of the hydraulic cylinder 115 makes it difficult to finely adjust the oscillation width and number of oscillations of the oscillating rollers 101 and 102.

SUMMARY OF THE INVENTION

In view of the foregoing, an object of the present invention is to provide an oscillation apparatus for an oscillating roller which can adjust the oscillation state of the oscillating roller with high responsiveness by use of a simple mechanism.

In order to achieve the above object, an oscillation apparatus for an oscillating roller according to the present invention comprises: an oscillation mechanism for reciprocating an oscillating roller which can be rotated in the circumferential direction and can be reciprocated along the axial direction; an oscillation-width adjustment mechanism for adjusting the oscillation width of the oscillating roller; an oscillation-mechanism drive motor for operating the oscillation mechanism; an oscillation-width adjustment motor for operating the oscillation-width adjustment mechanism; oscillation-width control means for controlling operation of the oscillation-width adjustment motor such that the oscillation width of the oscillating roller attains a designated value; and oscillation-number control means for controlling operation of the oscillation-mechanism drive motor, on the basis of the number of revolutions of the plate cylinder, such that the number of oscillations of the oscillating roller per unit number of revolutions of the plate cylinder attains a designated value.

Preferably, the oscillation mechanism comprises a swing member which swings upon operation of the oscillation-mechanism drive motor, a moving member movably supported on the swing member, and an engagement member rotatably supported on the moving member and being in engagement with the oscillating roller; and the oscillation-width adjustment mechanism is configured such that, upon operation of the oscillation-width adjustment motor, the oscillation-width adjustment mechanism moves the moving member to thereby adjust a distance between a swing center of the swing member and a rotation center of the engagement member.

Preferably, the moving member is slidably supported on the swing member.

Preferably, the oscillation mechanism comprises a crank mechanism whose input side is connected to the oscillation-mechanism drive motor; a swingably-supported swing lever whose base end side is connected to the output side of the crank mechanism; a slide lever slidably supported by the swing lever such that the distal end side of the slide lever can move toward and away from a swing center of the swing lever; a first link plate whose one end side is rotatably supported by the distal end side of the slide lever; a swingably-supported swing plate, the other end side of the first link plate being rotatably connected to the base end side of the swing plate; and a cam follower provided at the distal end side of the swing plate and inserted into a groove wheel of the oscillating roller, and in that the oscillation-width adjustment mechanism comprises a worm gear connected to the oscillation-width adjustment motor; a worm wheel in meshing engagement with the worm gear; a transmission shaft coaxially connected to the worm wheel; a second link plate whose one end side is connected to the transmission shaft; and the slide lever whose base end side is rotatably connected to the other end side of the second link plate.

In the oscillation apparatus for an oscillating roller according to the present invention, the oscillation-width control means controls operation of the oscillation-width adjustment motor such that the oscillation width of the oscillating roller attains a designated value; and the oscillation-number control means controls operation of the oscillation-mechanism drive motor, on the basis of the number of revolutions of the plate cylinder, such that the number of oscillations of the oscillating roller per unit number of revolutions of the plate cylinder attains a designated value. Therefore, the control mechanism for the oscillating roller can be simplified. In addition, since the oscillating roller is operated by the above-described motors, the oscillating roller can be operated with high responsiveness, and the oscillation of the oscillating roller can be adjusted finely and easily. Accordingly, the oscillation state of the oscillating roller can be adjusted with high responsiveness by use of a simple mechanism.

DESCRIPTION OF THE PREFERRED EMBODIMENTS

Figure 1:
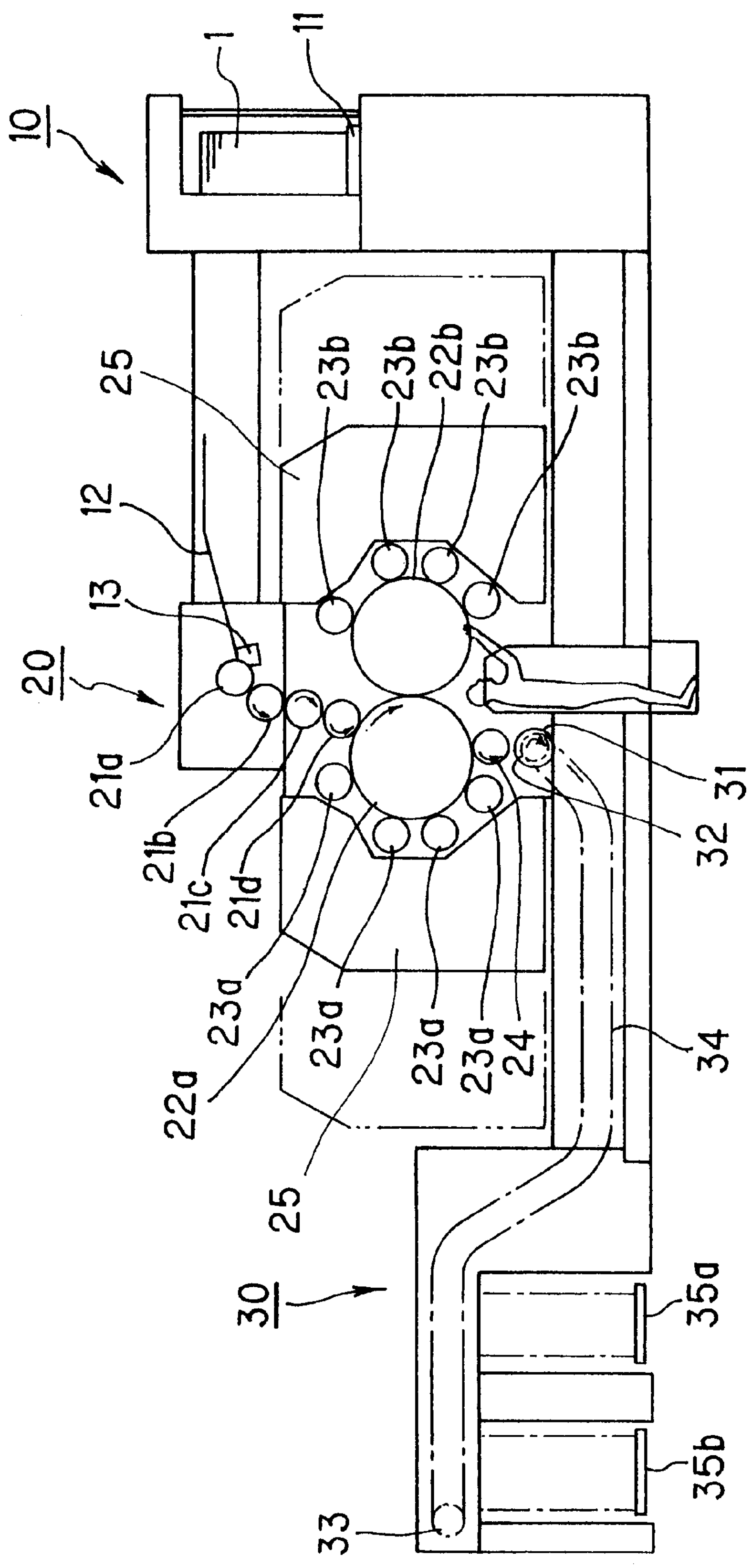
FIG. 1 is a view schematically showing the overall structure of an embodiment in which an oscillation apparatus for an oscillating roller according to the present invention is applied to an oscillating roller of an ink supply apparatus of a double-sided, multicolor offset press.
Figure 2:
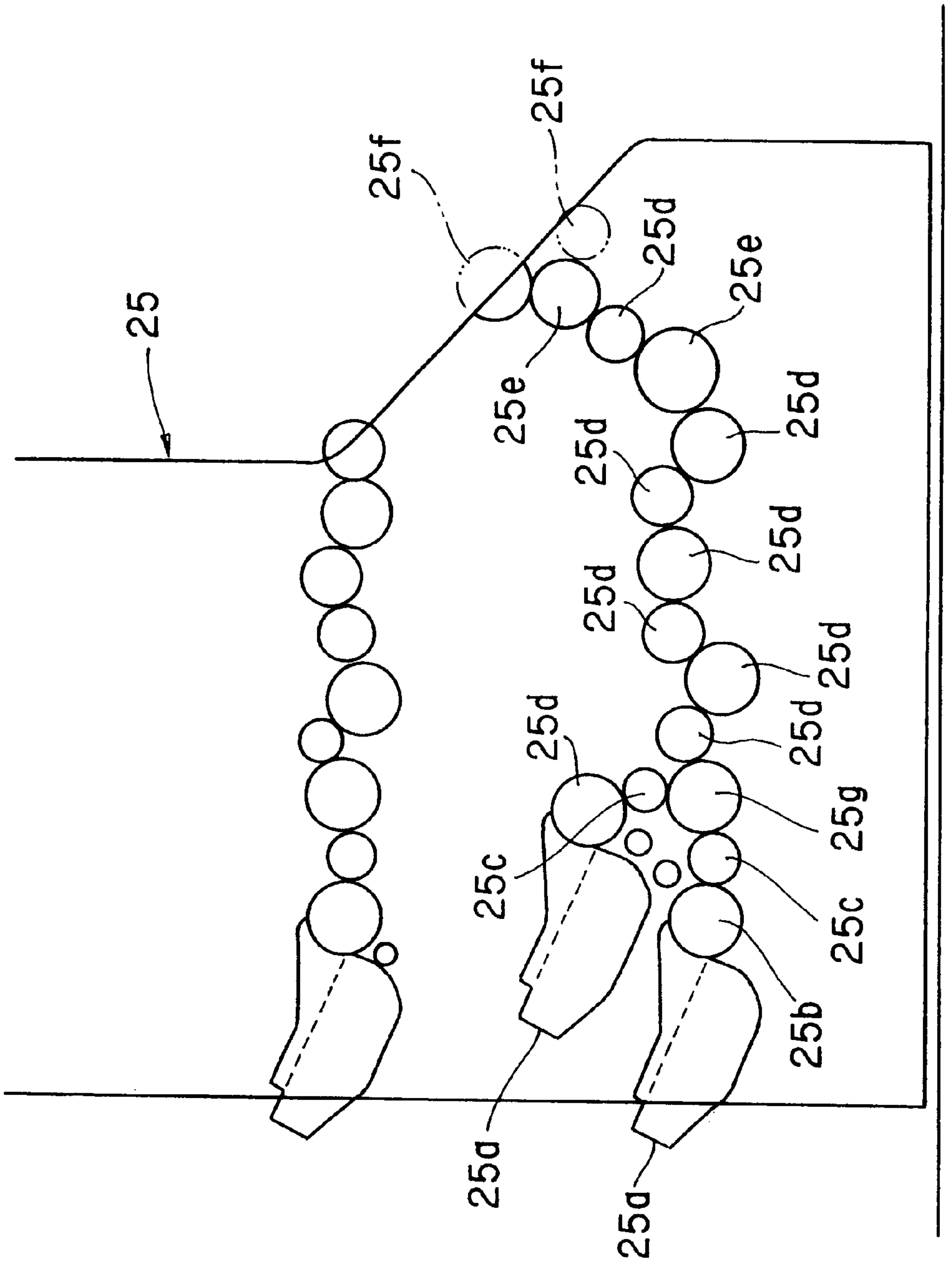
FIG. 2 is an enlarged view of an ink supply apparatus portion.
Figure 3:
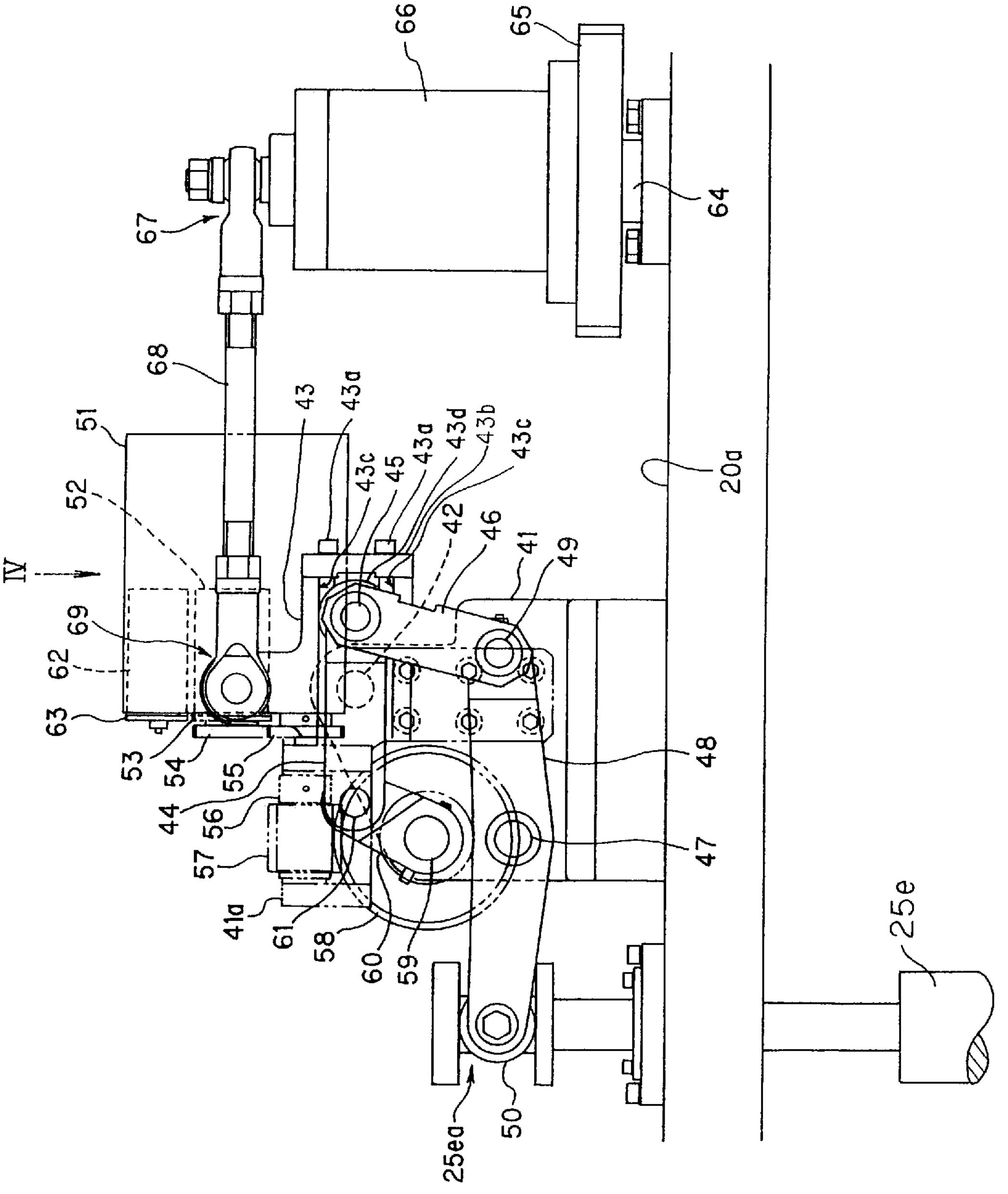
FIG. 3 is a side sectional view schematically showing the structure of a main portion of the oscillating-roller oscillation apparatus.
Figure 4:
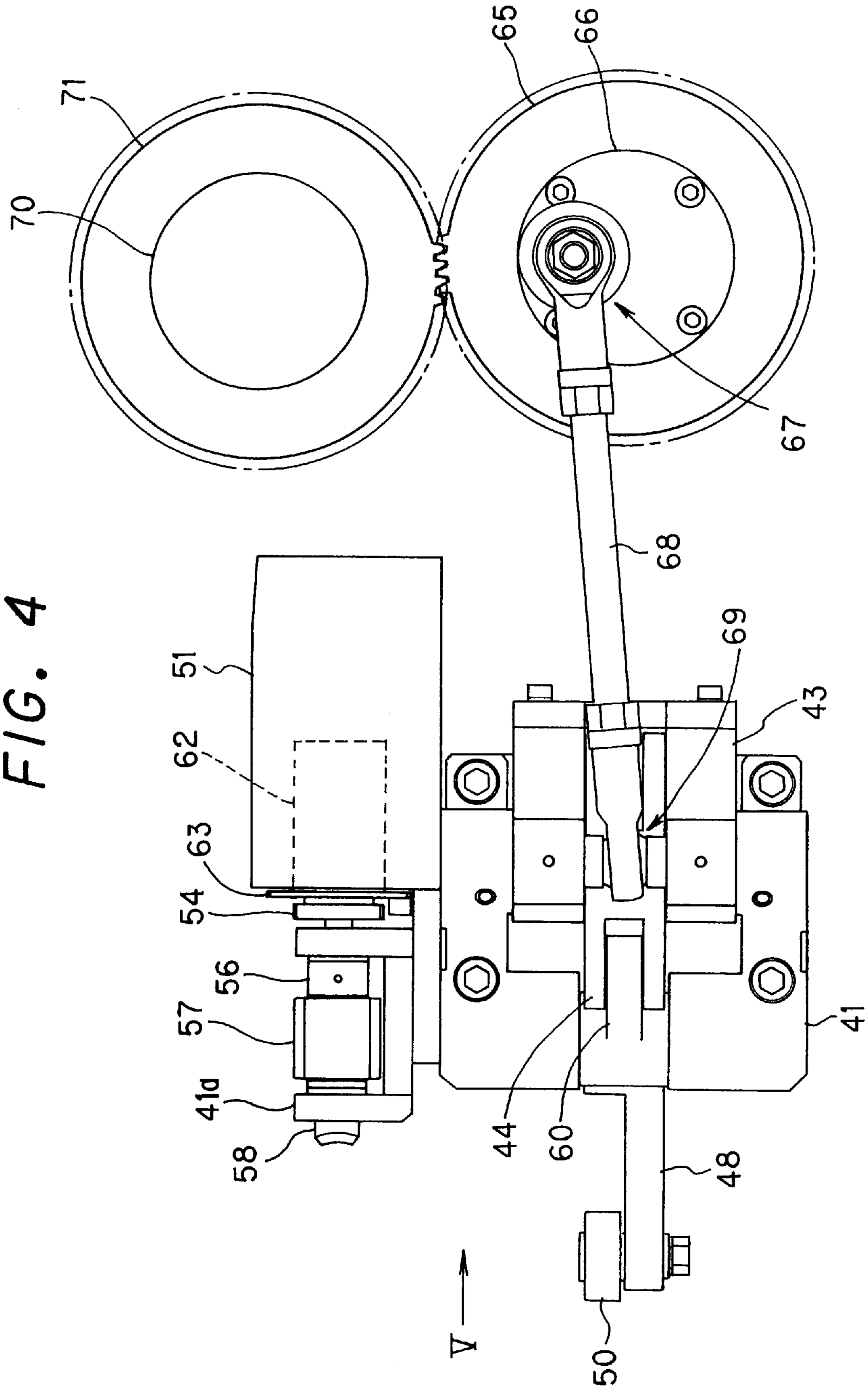
FIG. 4 is a plan view as viewed from the direction of arrow IV in FIG. 3.
Figure 5:
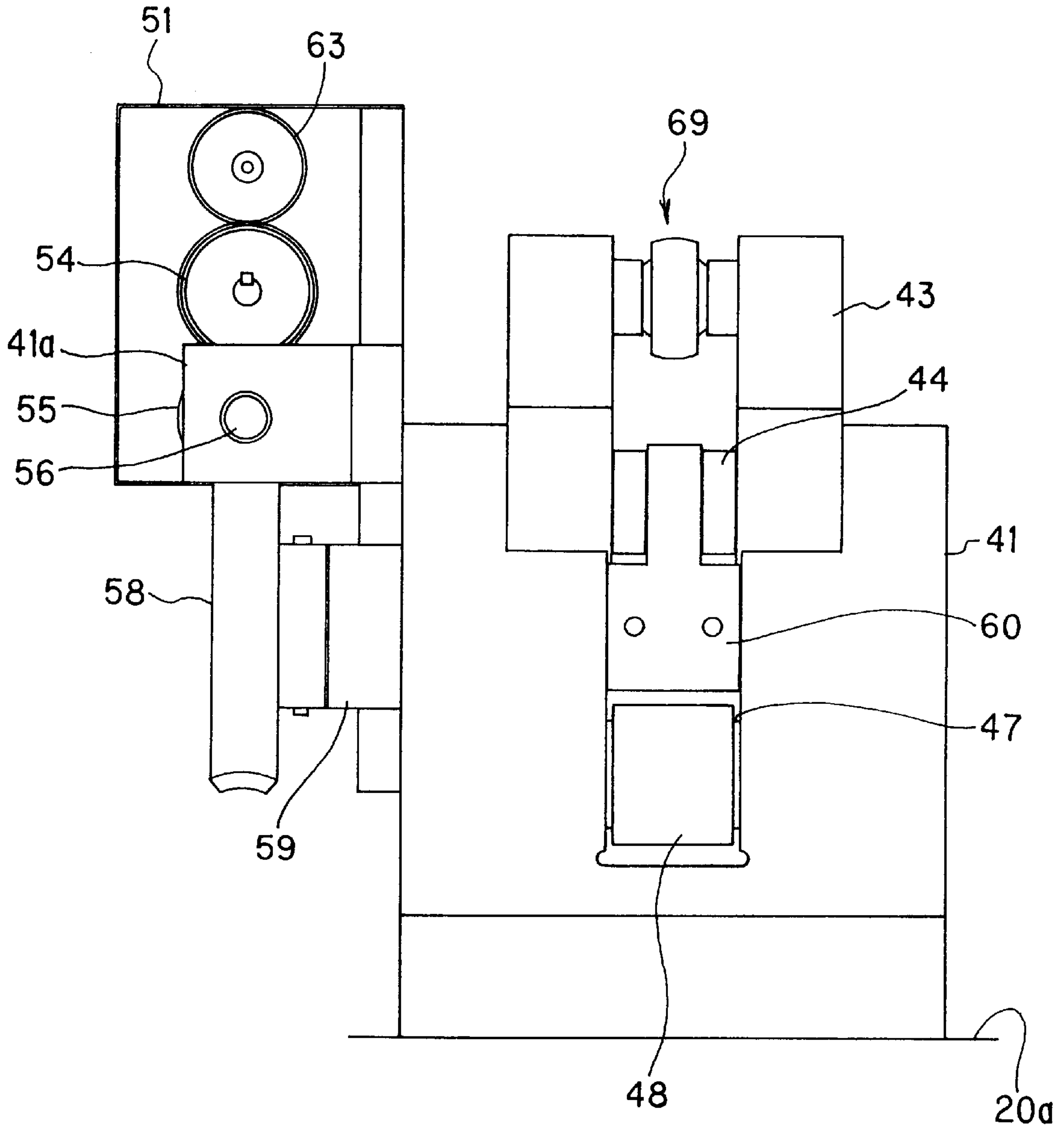
FIG. 5 is a front view as viewed from the direction of arrow V in FIG. 4.
Figure 6:
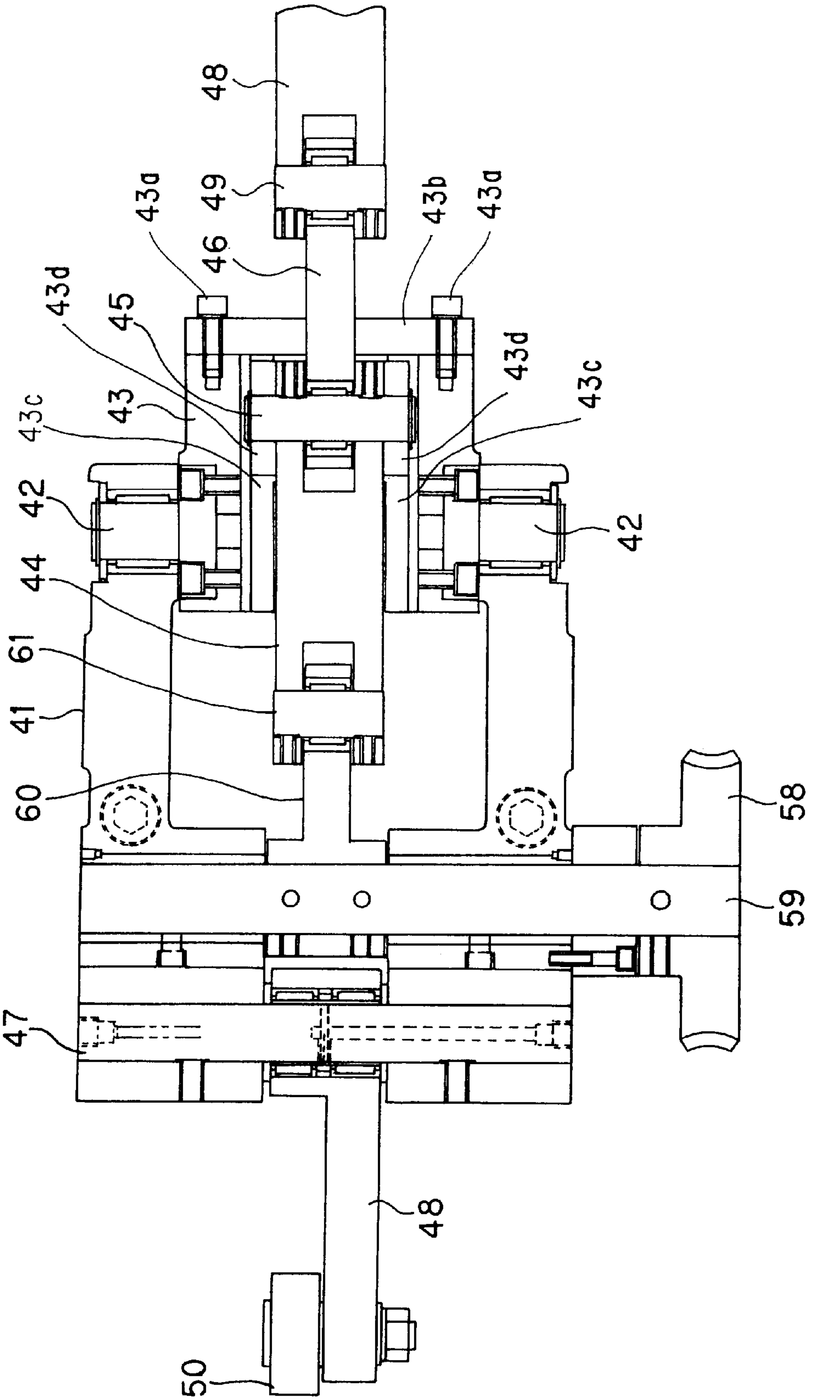
FIG. 6 is a horizontally-sectioned development view of a main portion of FIG. 3.
Figure 7:
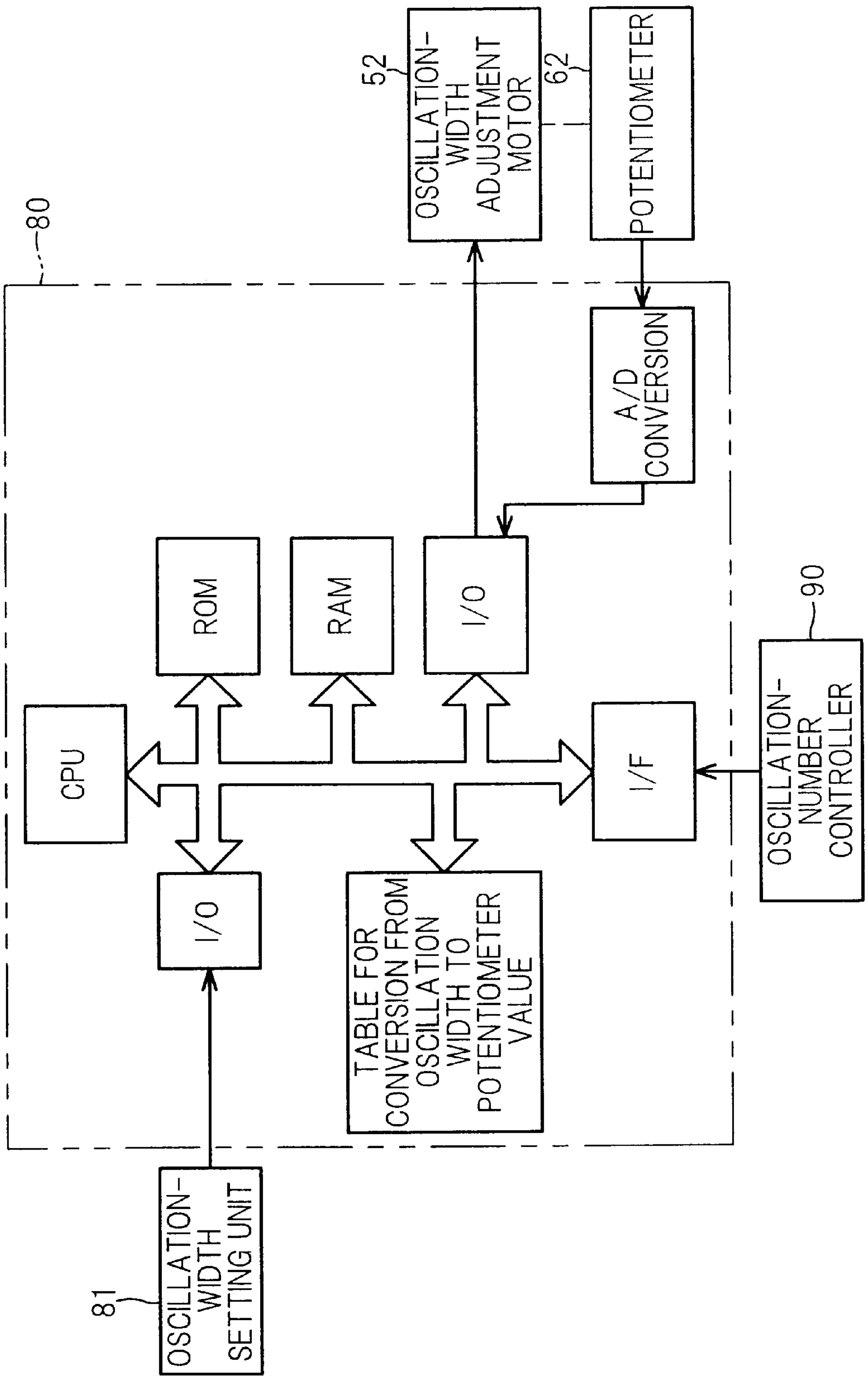
FIG. 7 is a block diagram of an oscillation-width controller.
Figure 8:
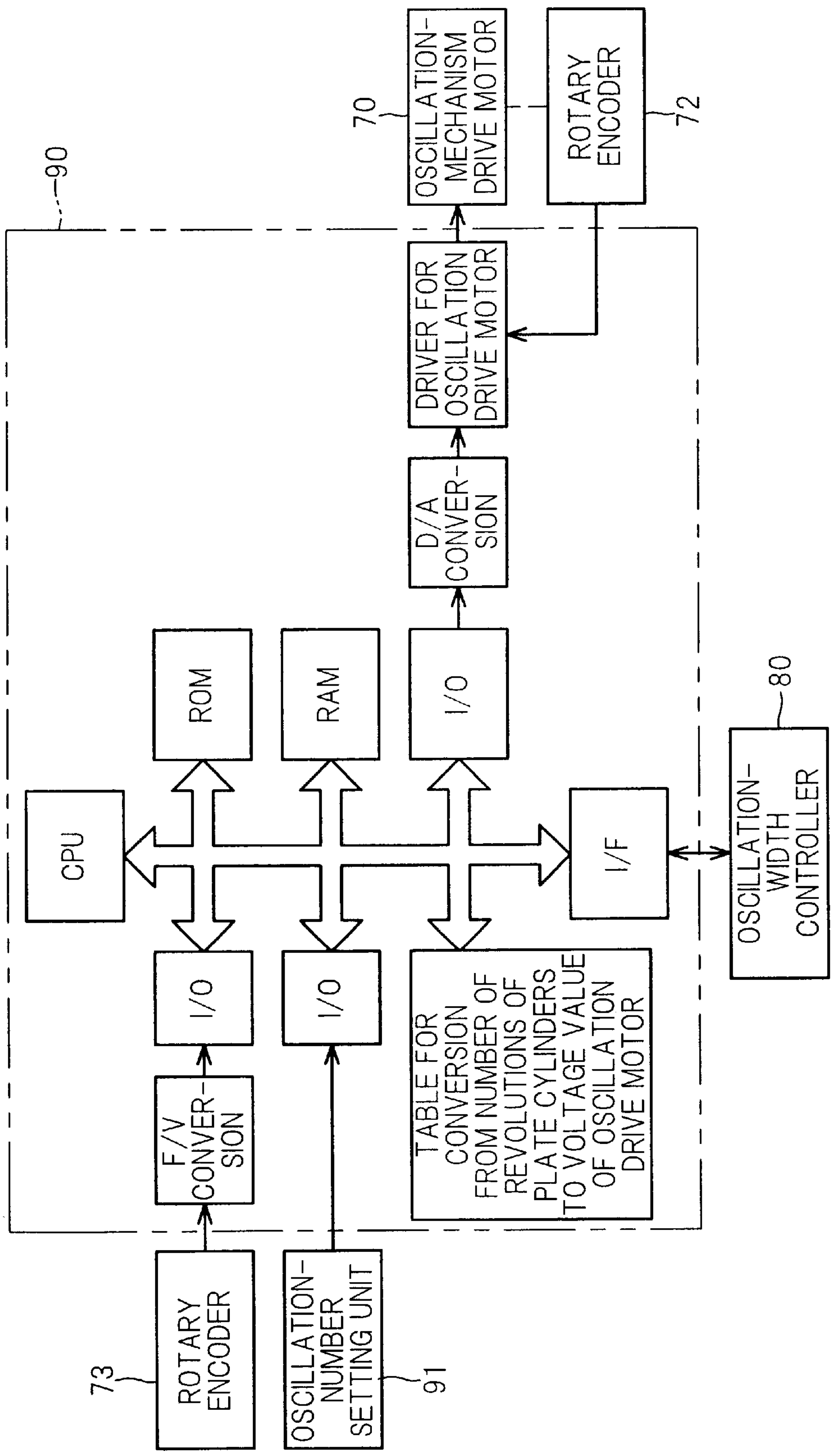
FIG. 8 is a block diagram of an oscillation-number controller.
Figure 9:
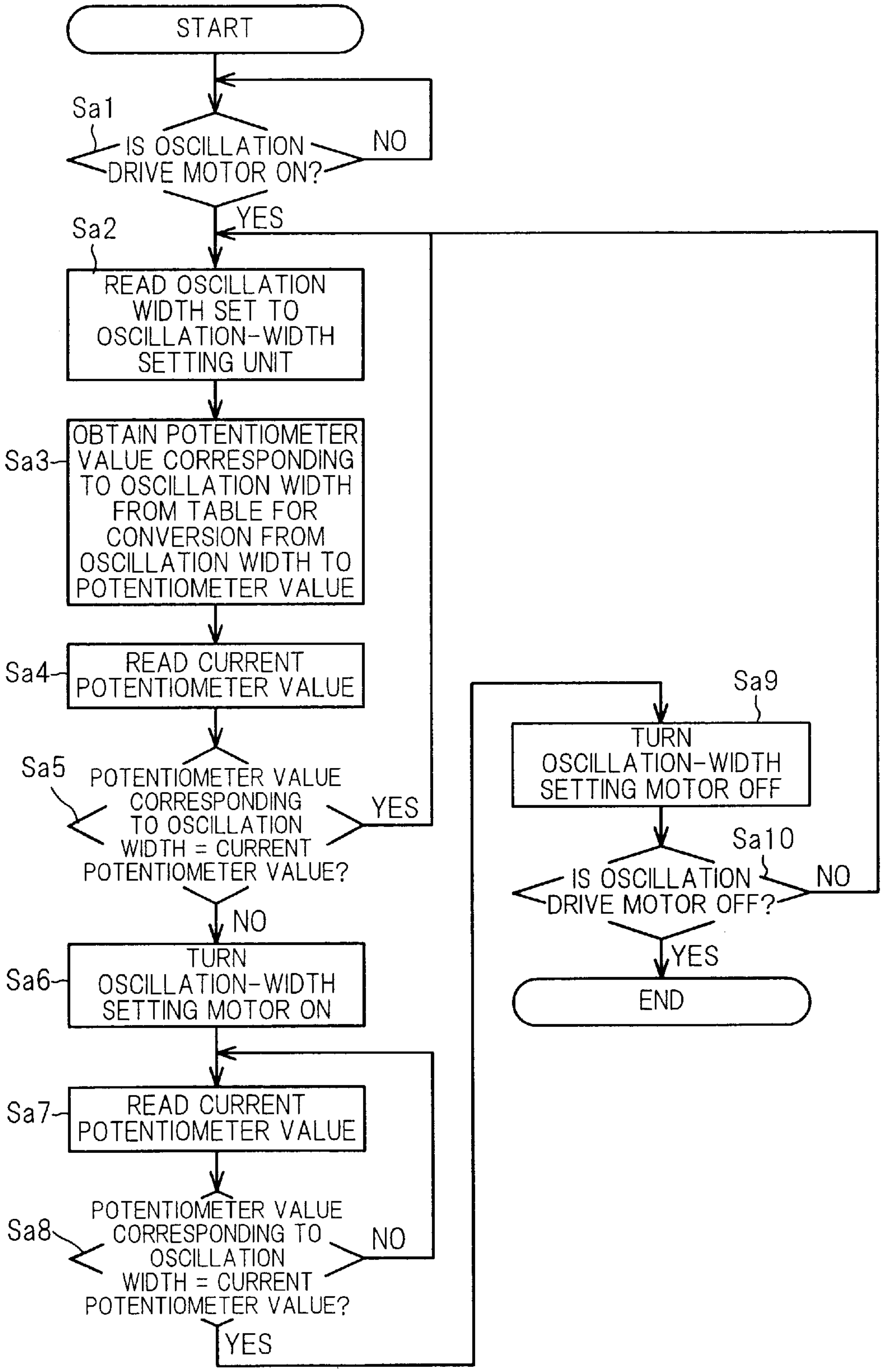
FIG. 9 is a flowchart for oscillation-width control.
Figure 10:
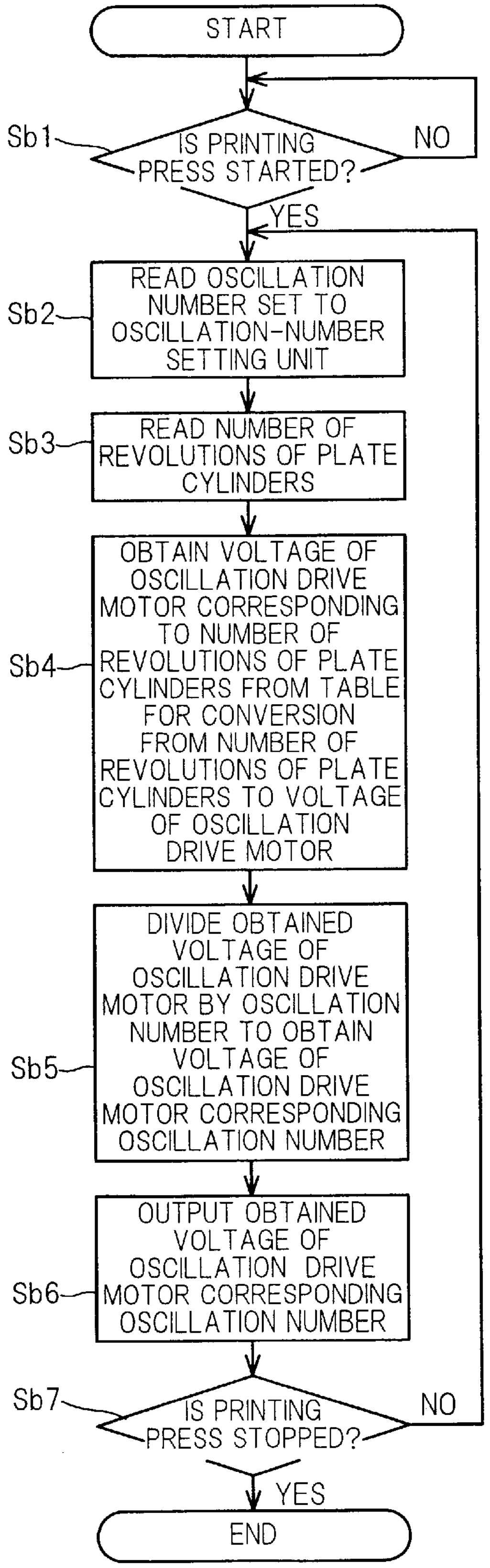
FIG. 10 is a flowchart for oscillation-number control.

An embodiment of the present invention will be described with reference to FIGS. 1 to 10. The embodiment is an ink supply apparatus of a double-sided, multicolor offset press which employs an oscillating-roller oscillation apparatus according to the present invention. FIG. 1 is a view schematically showing the overall structure of a double-sided, multicolor offset press; FIG. 2 is an enlarged view of an ink supply apparatus portion; FIG. 3 is a side sectional view schematically showing the structure of a main portion of the oscillating-roller oscillation apparatus; FIG. 4 is a plan view as viewed from the direction of arrow IV in FIG. 3; FIG. 5 is a front view as viewed from the direction of arrow V in FIG. 4; FIG. 6 is a horizontally-sectioned development view of a main portion of FIG. 3; FIG. 7 is a block diagram of an oscillation-width controller; FIG. 8 is a block diagram of an oscillation-number controller; FIG. 9 is a flowchart for oscillation-width control; and FIG. 10 is a flowchart for oscillation-number control.

As shown in FIG. 1, a sheet-feed table 11 is disposed within a feeder unit 10. A feeder board 12 is also provided in the feeder unit 10. The feeder board 12 feeds paper sheets (sheet-shaped objects) 1 from the sheet-feed table 11 to a printing unit 20 one sheet at a time. A swing apparatus 13 for transferring the paper sheets 1 to a transfer cylinder 21*a* of the printing unit 20 is provided at the distal end of the feeder board 12.

The transfer cylinder 21*a* is in contact with an impression cylinder 22*a* via transfer cylinders 21*b* to 21*d*. A blanket made of rubber is attached to the outer circumferential surface of the impression cylinder 22*a*. A rubber cylinder 22*b* is in contact with the impression cylinder 22*a* at a position downstream of the transfer cylinder 21*d*. A plurality of (four in the present embodiment) plate cylinders 23*a* are in contact with the impression cylinder 22*a* at positions upstream of the transfer cylinder 21*d* in such a manner that the plate cylinders 23*a* are arranged along the circumferential direction at predetermined intervals. A plurality of (four in the present embodiment) plate cylinders 23*b* are in contact with the rubber cylinder 22*b* at positions upstream of the impression cylinder 22*a* in such a manner that the plate cylinders 23*b* are arranged along the circumferential direction at predetermined intervals. A transfer cylinder 24 is in contact with the impression cylinder 22*a* at a position downstream of the rubber cylinder 22*b*.

A delivery cylinder 31 of a delivery unit 30 is in contact with the transfer cylinder 24. A gear 32 is coaxially fixed to the delivery cylinder 31. Further, a gear 33 is provided in the delivery unit 30. A delivery chain 34 is extended between and wound around the gears 32 and 33. A plurality of delivery grippers (not shown) are provided on the delivery chain 34 at predetermined intervals. Delivery tables 35*a* and 35*b* on which are placed printed paper sheets 100 are provided in the delivery unit 30.

As shown in FIG. 2, an ink supply apparatus 25 for supplying ink is provided for each of the plate cylinders 23*a*. The ink supply apparatus 25 includes ink fountains 25*a* for holding ink; fountain rollers 25*b* for feeding ink from the ink fountains 25*a*; ductor rollers 25*c* for drawing the ink fed by the fountain rollers 25*b*; distribution rollers 25*d* for distributing the drawn ink; oscillating rollers 25*e* for spreading the ink in the axial direction through reciprocating movement along the axial direction; form rollers 25*f* for supplying the ink to the corresponding plate cylinder 25*a*; and a drive roller 25*g* for rotating these rollers 25*b* to 25*f* in an interlocked manner.

As shown in FIGS. 3–6, a support base 41 is attached to a frame 20*a* of the printing unit 20 to be located in the vicinity of a shaft end side of the oscillating roller 25*e*. Two L-shaped swing levers 43 serving as a swing member are provided on the support base 41. The bent center portion of each swing lever 43 located between the distal end and base end thereof is supported by a support pin 42 such that the swing lever 43 can swing in a direction toward and away from the oscillating roller 25*e*. The two swing levers 43 are connected together by a plate 43*b* and bolts 43*a*.

A slide groove 43*c* is formed on each swing lever 43 to be located between the distal end and the bent center portion thereof. A block 43*d* is slidably attached to the slide groove 43*c* of each swing lever 43. The block 43*d* is supported by the corresponding end portion of a pin 45. The distal end side of a slide lever 44 serving as a moving member and a first end side of a first link plate 46 are rotatably connected to the pin 45. In other words, the distal end side of the slide lever 44 and the first end side of the first link plate 46 are supported by the swing levers 43 via the pin 45 and the blocks 43*d* such that they can move toward and away from the support pin 42.

The base end side of a swing plate 48 is rotatably connected to a second end side of the first link plate 46 via a pin 49. A portion of the swing plate 48 located between the distal end and base end thereof is pivotally supported on the support base 41 via a support pin 47. A cam follower 50 is attached to the distal end side of the swing plate 48. The cam follower 50 is inserted into a groove wheel 25*ea* provided at the shaft end side of the above-described oscillating roller 25*e*. The shaft end side of the oscillating roller 25*e* is slidably supported such that the oscillating roller 25*e* can reciprocate in the axial direction.

Meanwhile, a casing 51 is attached to the support base 41. The casing 51 includes a oscillation-width adjustment motor 52 which can be rotated in regular and reverse directions and is equipped with a brake. A gear 53 and a drive gear 54 are coaxially attached to the drive shaft of the motor 52. The drive gear 54 is in meshing engagement with a transmission gear 55 rotatably supported on the casing 51. One end side of a drive shaft 56 which is rotatably supported on the support base 41 via a bracket 41*a* is coaxially connected to the transmission gear 55.

A worm gear 57 is coaxially attached to the drive shaft 56. A worm wheel 58 which is rotatably supported on the support base 41 is in meshing engagement with the worm gear 57. A transmission shaft 59 is rotatably supported on the support base 41, and one end side of the transmission shaft 59 is coaxially connected to the worm wheel 58. One end side of a second link plate 60 is fixedly connected to the transmission shaft 59. The other end side of the second link plate 60 is rotatably connected to the base end side of the slide lever 44 via a pin 61.

That is, when the motor 52 is driven, the slide lever 44 is moved via the drive gear 54, the transmission gear 55, the drive shaft 56, the worm gear 57, the worm wheel 58, the transmission shaft 59, the second link plate 60, and the pin 61, so that the slide lever 44 slides along the slide groove 43*c* of the swing lever 43 together with the pin 45 and the block 43*d*. As a result, the pin 45 serving as the center of swinging motion of the first link plate 46 can be brought closer to and further away from the support pin 42 serving as the center of swing motion of the swing levers 43. Thus, the distance between the pins 42 and 45 can be adjusted.

A potentiometer 62 is provided within the casing 51. A gear 63 is coaxially attached to the input shaft of the potentiometer 62 and is in meshing engagement with the gear 53.

Therefore, when the motor 52 is driven, the gear 53 rotates, and the rotational amount of the gear 53 is detected by the potentiometer 62 via the gear 63. Thus, the distance between the pins 42 and 45 can be detected.

On the frame 20*a*, the base end side of a support shaft 64 is supported in a cantilever manner in the vicinity of the support base 41 such that the axis of the support shaft 64 becomes parallel to the axis of the oscillating roller 25*e*. A transmission gear 65 is coaxially attached to the support shaft 64 at a position near the frame 20*a*. A rotary drum 66 is coaxially attached to the distal end side of the support shaft 64.

A universal joint 67 is attached to one end surface of the rotary drum 66 to be offset from the center axis of the rotary drum 66. The base end side of a shaft 68 is connected to the universal joint 67. The distal end side of the shaft 68 is connected to the base ends of the swing levers 43 via a universal joint 69. Further, a oscillation-mechanism drive motor 70 is fixedly supported on the frame 20*a*, and a drive gear 71 of the motor 70 is in meshing engagement with the transmission gear 65.

That is, when the drive gear 71 is rotated through operation of the oscillation-mechanism drive motor 70, the rotary drum 66 is rotated via the transmission gear 65 and the support shaft 64. As the rotary drum 66 rotates, the universal joint 67 revolves, and consequently, the shaft 68 reciprocates along its axial direction. This reciprocating motion of the shaft 68 is transmitted to the base ends of the swing levers 43 via the universal joint 69, so that the distal ends of the swing levers 43 can be swung about the support pin 42.

Further, as shown in FIG. 7, the oscillation-width adjustment motor 52 and the potentiometer 62 are connected to an oscillation-width controller 80. The oscillation-width controller 80 controls the amount of rotation of the motor 52 on the basis of a signal from the potentiometer 62. An oscillation-width setting unit 81 for inputting command signals such as an oscillation width of the oscillating roller 25*e* is connected to the oscillation-width controller 80.

Meanwhile, as shown in FIG. 8, the oscillation-mechanism drive motor 70 and a rotary encoder 72 connected to the motor 70 are connected to an oscillation-number controller 90. The oscillation-number controller 90 controls the motor 70 while checking the number of revolutions of the motor 70 on the basis of a signal from the rotary encoder 72. A rotary encoder 73 for detecting the number of revolutions of the transfer cylinder 21*a*; i.e., the number of revolutions of the plate cylinders 23*a* and 23*b*, and an oscillation-number setting unit 91 for inputting command signals such as the number of oscillations of the oscillating roller 25*e* corresponding to the number of revolutions of the plate cylinders 23*a* and 23*b* are connected to the oscillation-number controller 90.

That is, the oscillation-number controller 90 controls the oscillation-mechanism drive motor 70 on the basis of a signal from the rotary encoder 73, while checking the signal from the rotary encoder 72, such that the number of oscillations of the oscillating roller 25*e* becomes equal to the value input and designated by the oscillation-number setting unit 91.

As shown in FIGS. 7 and 8, the oscillation-width controller 80 and the oscillation-number controller 90 are connected to each other, and the oscillation-width controller 80 drives the oscillation-width adjustment motor 52 after checking the drive state of the oscillation-mechanism drive motor 70 via the oscillation-number controller 90.

In the present embodiment, a clank mechanism is constituted by the support shaft 64, the transmission gear 65, the rotary drum 66, the universal joint 67, the shaft 68, the universal joint 69, etc.; an engagement member is constituted by the pin 45, the first link plate 46, the support pin 47, the swing plate 48, the pin 49, the cam follower 50, etc.; an oscillation mechanism is constituted by the clank mechanism, the engagement member, the support base 41, the support pin 42, the swing levers 43, the slide lever 44, etc.; an oscillation-width adjustment mechanism is constituted by the support base 41, the drive gear 54, the transmission gear 55, the drive shaft 56, the worm gear 57, the worm wheel 58, and the transmission shaft 59, the second link plate 60, the pin 61, the slide lever 44, etc.; oscillation-width control means is constituted by the gears 53 and 63, the potentiometer 62, the oscillation-width controller 80, the oscillation-width setting unit 81, etc.; and oscillation-number control means is constituted by the rotary encoders 72 and 73, the oscillation-number controller 90, the oscillation-number setting unit 91, etc.

In the double-sided, multicolor offset press equipped with the above-described oscillation apparatus for the oscillating roller 25*e*, when the paper sheet 1 is transferred from the sheet-feed table 11 of the feeder unit 10 to the transfer cylinder 21*a* via the feeder board 12 and the swing apparatus 13, the paper sheet 1 is transferred to the impression cylinder

22*a* of the printing unit 20 via the transfer cylinders 21*b* to 21*d* and passes through the space between the impression cylinder 22*a* and the rubber cylinder 22*b*.

At this time, ink from the ink supply apparatus 25 is supplied to each of plates attached to the plate cylinders 23*a* and 23*b*. As a result, ink held on the plate of each plate cylinder 23*a* at portions corresponding to an image thereof is supplied to the blanket at the outer circumferential surface of the impression cylinder 22*a*, and ink held on the plate of each plate cylinder 23*b* at portions corresponding to an image thereof is supplied to the blanket at the outer circumferential surface of the rubber cylinder 22*b*. Therefore, as the paper sheet 1 passes through the space between the cylinders 22*a* and 22*b*, the image of the impression cylinder 22*a* is transferred onto one face of the paper sheet 1 and the image of the rubber cylinder 22*b* is transferred onto the other face of the paper sheet 1.

The paper sheet 1 having undergone double-sided, multicolor printing is transferred to the delivery cylinder 31 via the transfer cylinder 24. Subsequently, after having been gripped by the grippers of the delivery chain 33, the paper sheet 1 is conveyed to the delivery tables 35*a* and 35*b* and is then delivered.

When ink is supplied from the ink supply apparatus 25 to the plate cylinders 23*a* and 23*b* in the above-described manner, the oscillation width and number of oscillations of the oscillating roller 25*e* are adjusted as follows.

[Oscillation-width adjustment]

When an oscillation width of the oscillating roller 25*e* is input to the oscillation-width setting unit 81, as shown in FIG. 9, the oscillation-width controller 80 first checks whether the oscillation-mechanism drive motor 70 is being operated, on the basis of the signal from the oscillation-number controller 90 (Sa1). When the oscillation-mechanism drive motor 70 is stopped, the oscillation-width controller 80 waits, without proceeding to the next step, until the oscillation-mechanism drive motor 70 starts its operation. When the oscillation-mechanism drive motor 70 is operating, the oscillation-width controller 80 proceeds to the next step. This is because if the oscillating roller 25*e* is operated while the various rollers 25*a* to 25*g* of the ink supply apparatus 25 are stopped, the roller surface may be damaged due to friction therebetween.

Next, the oscillation-width controller 80 reads the oscillation width input from the oscillation-width setting unit 81 (Sa2), and obtains a value of the potentiometer 62 corresponding to the input oscillation width, on the basis of a conversion table which defines the relationship between oscillation width of the oscillating roller 25*e* (the distance between the pins 42 and 45) and value of the potentiometer 62 (Sa3). Subsequently, the oscillation-width controller 80 reads the current value of the potentiometer 62 (Sa4) and checks whether the read value of the potentiometer 62 is equal to the value obtained in the above-described step Sa3 (Sa5). When these values are equal to each other, the oscillation-width controller 80 returns to the above-described step Sa2 (the current status is maintained). When these values are not equal to each other, the oscillation-width controller 80 proceeds to the next step.

When the above-described two values are not equal to each other, the oscillation-width controller 80 operates the oscillation-width adjustment motor 52 (Sa6), reads the present value of the potentiometer 62 (Sa7), and checks whether the read value of the potentiometer 62 is equal to the value obtained in the above-described step Sa3 (Sa8). When these values are not equal to each other, the oscillation-width controller 80 repeats the above-described steps Sa6 to Sa8 until these values become equal to each other. When the values becomes equal to each other, the oscillation-width controller 80 proceeds to the next step.

When the above-described two values become equal to each other, the oscillation-width controller 80 stops the operation of the oscillation-width adjustment motor 52 (Sa9), and checks whether the oscillation-mechanism drive motor 70 is being operated (Sa10). When the oscillation-mechanism drive motor 70 is operating, the oscillation-width controller 80 returns to the above-described step Sa2. When the oscillation-mechanism drive motor 70 is stopped, the oscillation-width controller 80 ends the control. Through this operation, the distance between the pins 42 and 45 is set via the drive gear 54, the transmission gear 55, the drive shaft 56, the worm gear 57, the worm wheel 58, the transmission shaft 59, the second link pate 60, the pin 61, and the slide lever 44.

[Oscillation-number adjustment]

When a number of oscillations of the oscillating roller 25*e* (the number of revolutions of the plate cylinders 23*a* and 23*b* during each round of reciprocating travel of the oscillating roller 25*e*) is input through the oscillation-number setting unit 91, as shown in FIG. 10, the oscillation-number controller 90 first checks whether the transfer cylinder 21*a* is being rotated; i.e., whether the printing press is being operated, on the basis of the signal from the rotary encoder 73 (Sb1). When the printing press is not operated, the oscillation-number controller 90 waits, without proceeding to the next step, until the printing press is started. When the printing press is operating, the oscillation-number controller 90 proceeds to the next step. This is because if the oscillating roller 25*e* is operated while the various rollers 25*a* to 25*g* of the ink supply apparatus 25 are stopped, the roller surface may be damaged due to friction therebetween.

Next, the oscillation-number controller 90 reads the number of oscillations input from the oscillation-number setting unit 91 (Sb2), reads the number of revolutions of the transfer cylinder 21*a*; i.e., the number of revolutions of the plate cylinders 23*a* and 23*b* from the rotary encoder 73 (Sb3), and obtains a voltage value of the oscillation-mechanism drive motor 70 corresponding to the number of revolutions of the plate cylinders 23*a* and 23*b*, on the basis of a conversion table which defines the relationship between number of revolutions of the plate cylinders 23*a* and 23*b* and voltage value of the oscillation-mechanism drive motor 70 (Sb4). Subsequently, the thus-obtained voltage value is divided by the input number of oscillations to thereby obtain the voltage value of the oscillation-mechanism drive motor 70 corresponding to the number of oscillations (Sb5). Subsequently, the oscillation-number controller 90 drives and controls the motor 70 in accordance with the voltage value (Sb6).

Subsequently, the oscillation-number controller 90 checks whether the printing press is being operated (Sb7). When the printing press is operating, the oscillation-number controller 90 returns to the above-described step Sb2. When the printing press is stopped, the oscillation-number controller 90 ends the control. Through this operation, the pin 45 is moved via the drive gear 71, the transmission gear 65, the support shaft 64, the rotary drum 66, the universal joint 67, the shaft 68, the universal joint 69, and the swing levers 43 such that the pin 45 reciprocatively revolves about the support pin 42 with a period which always corresponds to the rotational period of the plate cylinders 23*a* and 23*b*. Consequently, the swing plate 48 is moved via the first link plate 46 and the pin 49 such that the swing plate 48 swings about the support pin 47 with a period which always corresponds to the rotational period of the plate cylinders

23*a* and 23*b*. Thus, via the cam follower 50 inserted into the groove wheel 25*ea*, the oscillating roller 25*e* reciprocates a plurality of number of times which always corresponds to the rotational period of the plate cylinders 23*a* and 23*b*.

Therefore, the above-described oscillation apparatus has the following advantages. (1) Since the oscillation width of the oscillating roller 25*e* is adjusted through control of the rotational amount of the oscillation-width adjustment motor 52 and the number of oscillations of the oscillating roller 25*e* is adjusted through control of the rotational speed of the oscillation-mechanism drive motor 70, the control mechanism for the oscillating roller 25*e* can be simplified. (2) Since the state of oscillation of the oscillating roller 25*e* is controlled by the above-described motors 52 and 70, the oscillating roller 25*e* can be operated with high responsiveness, and the oscillation of the oscillating roller 25*e* can be adjusted finely and easily.

Accordingly, the above-described oscillation apparatus enables the oscillation state of the oscillating roller 25*e* to be adjusted with high responsiveness by use of a simple mechanism.

Figure 11:
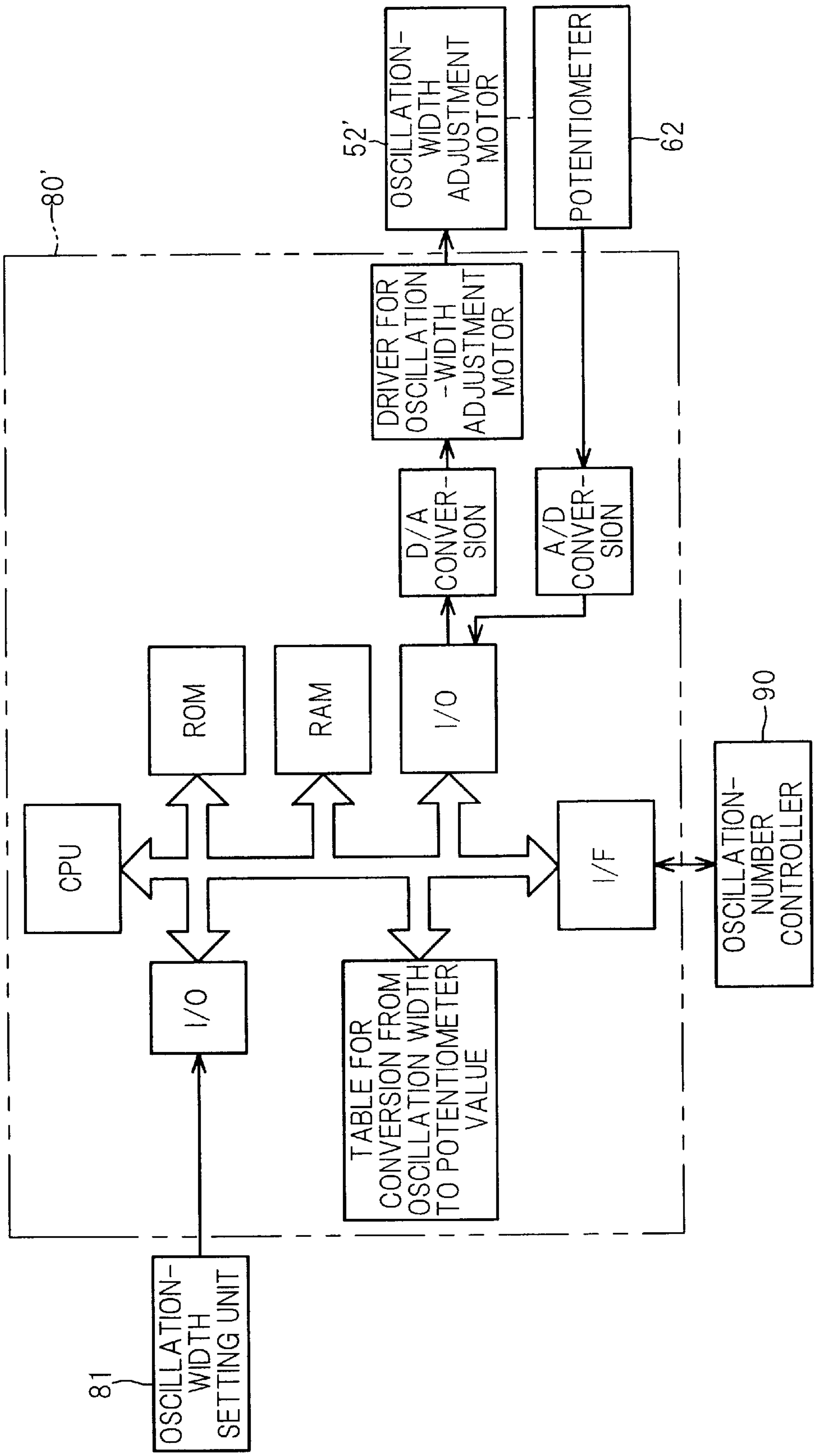
FIG. 11 is a block diagram of an oscillation-number controller.
Figure 12:
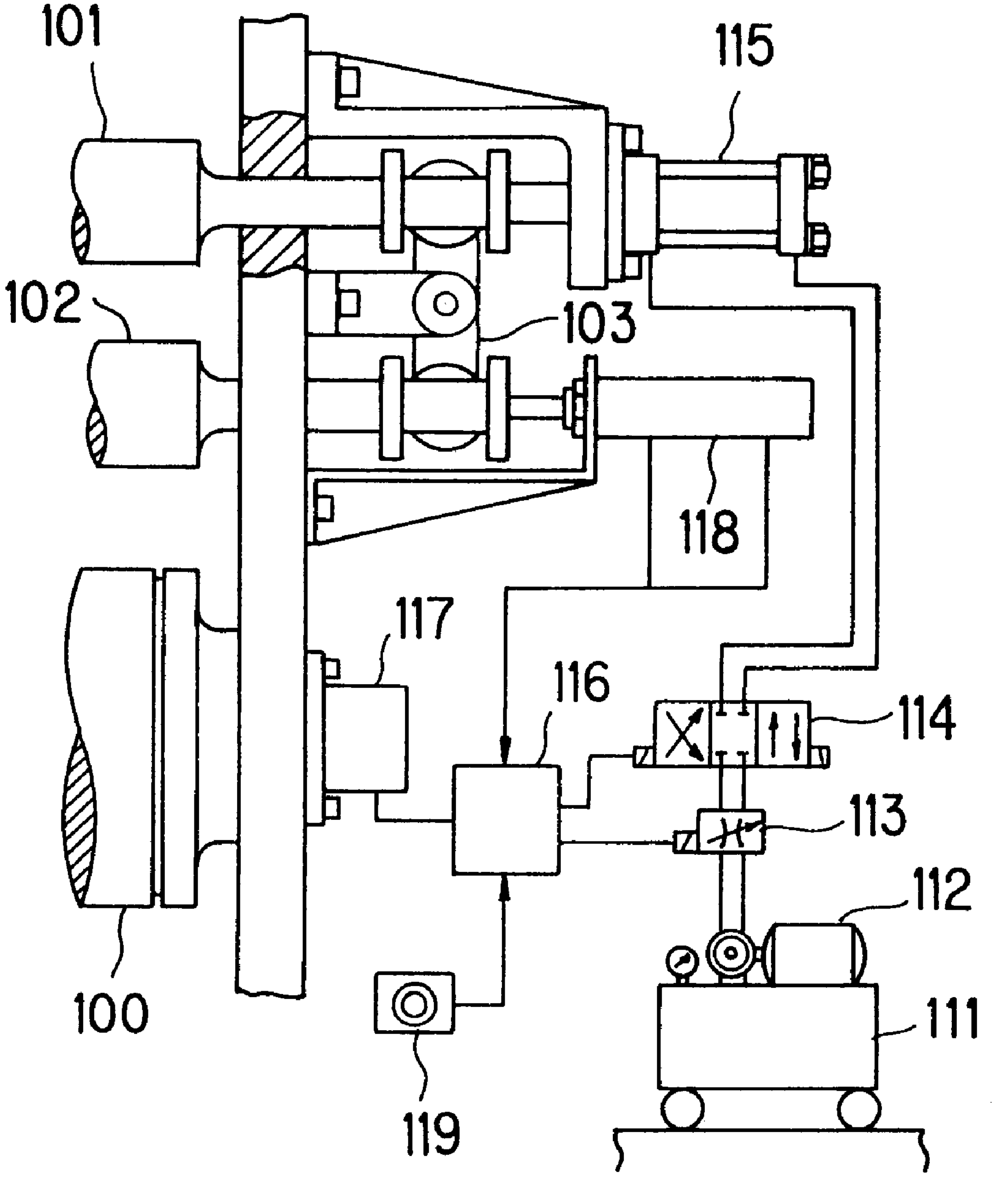
FIG. 12 is a view schematically showing the overall structure of a conventional oscillation apparatus.

When an induction motor is used for the oscillation-width adjustment motor 52, as shown in FIG. 7, the oscillation-width controller 80 is not required to have a driver for the motor 52. However, when an oscillation-width adjustment motor 52' composed of an ordinary servomotor is employed as shown in FIG. 11, an oscillation-width controller 80' having a driver for the motor 52' is used.

Obviously, numerous modifications and variations of the present invention are possible in light of the above teachings. It is therefore to be understood that within the scope of the appended claims, the present invention may be practiced otherwise than as specifically described herein.

What is claimed is:

1. An oscillation apparatus for an oscillating roller, comprising:

- an oscillation mechanism for reciprocating an oscillating roller which can be rotated in a circumferential direction and can be reciprocated along an axial direction;
- an oscillation-width adjustment mechanism for adjusting an oscillation width of said oscillating roller;
- an oscillation-mechanism drive motor for operating said oscillation mechanism;
- an oscillation-width adjustment motor for operating said oscillation-width adjustment mechanism;
- oscillation-width control means for controlling operation of said oscillation-width adjustment motor such that said oscillation width of said oscillating roller attains a designated value; and
- oscillation-number control means for controlling operation of said oscillation-mechanism drive motor, on the basis of the number of revolutions of a plate cylinder, such that the number of oscillations of said oscillating roller per unit number of revolutions of said plate cylinder attains a designated value.

2. An oscillation apparatus for an oscillating roller according to claim 1, wherein said oscillation mechanism comprises:

- a swing member which swings upon operation of said oscillation-mechanism drive motor;
- a moving member movably supported on said swing member; and
- an engagement member rotatably supported on said moving member and being in engagement with said oscillating roller, and wherein
  - said oscillation-width adjustment mechanism is configured such that, upon operation of said oscillation-width adjustment motor, said oscillation-width adjustment mechanism moves said moving member to thereby adjust a distance between a swing center of said swing member and a rotation center of said engagement member.

3. An oscillation apparatus for an oscillating roller according to claim 2, wherein said moving member is slidably supported on said swing member.

4. An oscillation apparatus for an oscillating roller according to claim 1, wherein said oscillation mechanism comprises:

- a crank mechanism whose input side is connected to said oscillation-mechanism drive motor;
- a swingably-supported swing lever whose base end side is connected to the output side of said crank mechanism;
- a slide lever slidably supported by said swing lever such that the distal end side of said slide lever can move toward and away from a swing center of said swing lever;
- a first link plate whose one end side is rotatably supported by the distal end side of said slide lever;
- a swingably-supported swing plate, the other end side of said first link plate being rotatably connected to the base end side of said swing plate; and
- a cam follower provided at the distal end side of said swing plate and inserted into a groove wheel of said oscillating roller, and wherein said oscillation-width adjustment mechanism comprises:

- a worm gear connected to said oscillation-width adjustment motor;
- a worm wheel in meshing engagement with said worm gear;
- a transmission shaft coaxially connected to said worm wheel;
- a second link plate whose one end side is connected to said transmission shaft; and
- said slide lever whose base end side is rotatably connected to the other end side of said second link plate.

* * * * *